United States Patent
Gomez et al.

(10) Patent No.: US 12,440,996 B2
(45) Date of Patent: Oct. 14, 2025

(54) COMMUNICATION ROBOT, COMMUNICATION ROBOT CONTROL METHOD, AND PROGRAM

(71) Applicant: HONDA MOTOR CO., LTD., Tokyo (JP)

(72) Inventors: Randy Gomez, Wako (JP); Yu Fang, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 18/294,568

(22) PCT Filed: Jul. 29, 2022

(86) PCT No.: PCT/JP2022/029225
§ 371 (c)(1),
(2) Date: Feb. 2, 2024

(87) PCT Pub. No.: WO2023/017745
PCT Pub. Date: Feb. 16, 2023

(65) Prior Publication Data
US 2024/0335952 A1    Oct. 10, 2024

(30) Foreign Application Priority Data
Aug. 10, 2021   (JP) .................................. 2021-130726

(51) Int. Cl.
*B25J 11/00*   (2006.01)
*B25J 9/16*    (2006.01)
(Continued)

(52) U.S. Cl.
CPC ......... *B25J 11/0015* (2013.01); *B25J 9/1664* (2013.01); *G06T 7/20* (2013.01);
(Continued)

(58) Field of Classification Search
CPC .... B25J 11/0015; B25J 9/1664; B25J 19/021; B25J 19/026; B25J 13/08; B25J 11/0005;
(Continued)

(56) References Cited

U.S. PATENT DOCUMENTS 7,003,139 B2 *   2/2006   Endrikhovski ......... G06F 16/58
                                                    382/118
7,043,056 B2 *   5/2006   Edwards .............. G06V 40/171
                                                    382/118
(Continued)

FOREIGN PATENT DOCUMENTS

JP   2006-247780    9/2006
JP   2010-010857    1/2010
(Continued)

OTHER PUBLICATIONS

International Search Report and Written Opinion for International Application No. PCT/JP2022/029225 mailed on Oct. 11, 2022, 11 pages.
(Continued)

*Primary Examiner* — Bhavesh V Amin
(74) *Attorney, Agent, or Firm* — Amin, Turocy & Watson, LLP

(57) ABSTRACT

A communication robot includes an auditory information processing portion configured to recognize a volume of voice collected by a sound collection portion and generate an auditory attention map by projecting a sound position in a three-dimensional space onto a two-dimensional attention map in which the robot is located at a center, a visual information processing portion configured to generate a visual attention map using a face detection result obtained by detecting a face of a person from an image captured by an imaging portion and a motion detection result obtained by detecting a motion of the person, an attention map generation portion configured to generate an attention map by
(Continued)

integrating the auditory attention map and the visual attention map, and a motion processing portion configured to control eyeball movements and motions of the communication robot using the attention map.

7 Claims, 10 Drawing Sheets

(51) Int. Cl.
    *B25J 19/02*     (2006.01)
    *G06T 7/20*     (2017.01)
    *G06V 40/16*     (2022.01)
    *G10L 15/22*     (2006.01)
    *G10L 21/10*     (2013.01)

(52) U.S. Cl.
    CPC ............ *G06V 40/161* (2022.01); *G10L 15/22* (2013.01); *G10L 21/10* (2013.01); *B25J 19/021* (2013.01); *B25J 19/026* (2013.01); *G06T 2207/30201* (2013.01)

(58) Field of Classification Search
    CPC ............ G06T 7/20; G06T 2207/30201; G06V 40/161; G10L 15/22; G10L 21/10; A63H 11/00
    See application file for complete search history.

(56) References Cited

U.S. PATENT DOCUMENTS

| | | | | |
|---|---|---|---|---|
| 7,306,337 | B2 * | 12/2007 | Ji | G06F 18/2431 382/103 |
| 7,889,244 | B2 * | 2/2011 | Tsukizawa | G06F 3/012 348/222.1 |
| 9,256,071 | B1 * | 2/2016 | Spitzer | H04N 13/366 |
| 9,779,299 | B2 * | 10/2017 | Strombom | G06V 40/19 |
| 2003/0165270 | A1 * | 9/2003 | Endrikhovski | G06F 3/011 382/189 |
| 2004/0174496 | A1 * | 9/2004 | Ji | G06F 18/2431 351/209 |
| 2009/0273687 | A1 * | 11/2009 | Tsukizawa | G06T 7/74 348/222.1 |
| 2017/0173262 | A1 * | 6/2017 | Veltz | G16H 20/17 |
| 2022/0051672 | A1 | 2/2022 | Sakurai et al. | |
| 2024/0335952 | A1 * | 10/2024 | Gomez | A63H 11/00 |

FOREIGN PATENT DOCUMENTS

| | | |
|---|---|---|
| JP | 2013-237124 | 11/2013 |
| JP | 2014-137226 | 7/2014 |
| JP | 2020-067562 | 4/2020 |
| WO | 2020/129421 | 6/2020 |

OTHER PUBLICATIONS

Itti, et al. "A model of saliency-based visual attention for rapid scene analysis", IEEE Transactions on Pattern Analysis and Machine Intelligence, vol. 20, No. 11, pp. 1254-1259, Nov. 1998.

Nakajima, et al. "Interaction between facial expression and color", Scientific Reports, 2017.

Mola, et al. "Robust real-time face detection", International Journal of Computer Vision, 57(2): pp. 137-154, 2004.

Godbehere, et al. "Visual tracking of human visitors under variable-lighting conditions for a responsive audio art installation", 2012 American Control Conference (ACC), Montreal, QC, 2012, pp. 4305-4312.

Koch, et al. "Shifts in selective visual attention: Towards the underlying neural circuitry", Human Neurobiology, 4(4), pp. 219-227, 1985.

* cited by examiner

FIG. 9
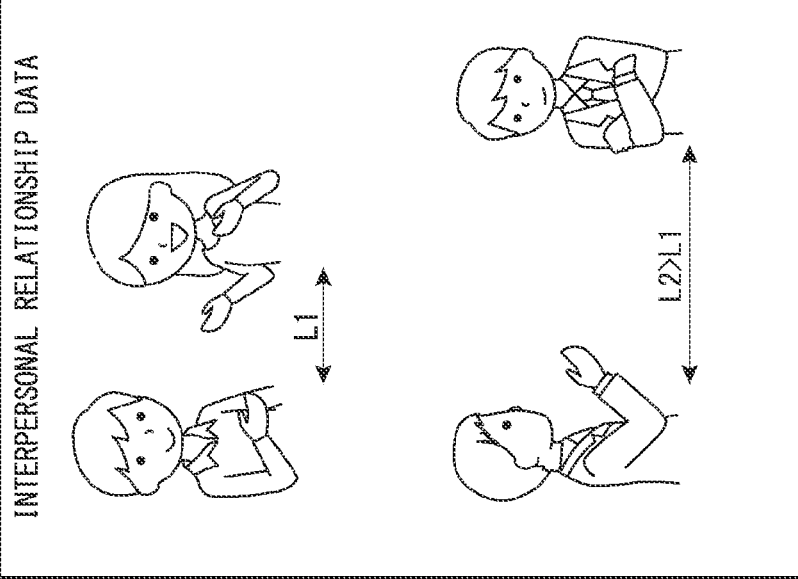
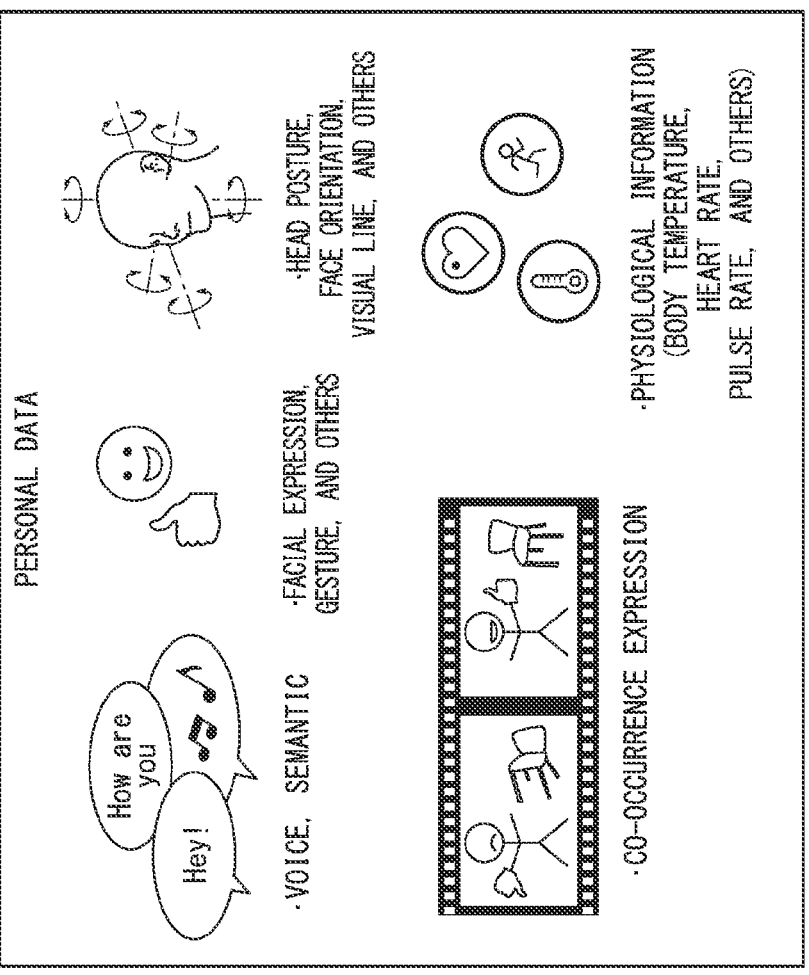

COMMUNICATION ROBOT, COMMUNICATION ROBOT CONTROL METHOD, AND PROGRAM

TECHNICAL FIELD

The present invention relates to a communication robot, a communication robot control method, and a program.

Priority is claimed on Japanese Patent Application No. 2021-130726, filed Aug. 10, 2021, the content of which is incorporated herein by reference.

BACKGROUND ART

The eye is both a visual organ that externally receives visual information and a cognitively special stimulus that provides information about an internal mental state. Also, it has also been neurologically proven that the face is a special stimulus that attracts attractive attention in very early visual processing stages, such as from the primary visual cortex (V1) and the external striatum cortices (V2 and V3). A saliency map, which is a heat map for estimating locations that are likely to attract attention when a person looks at an image, is an attention model for predicting attention shifts on an image, such as a visual search strategy (see, for example, Non-Patent Document 1).

In contrast to the visual saliency map, few models have been proposed to determine the saliency of a voice signal. In human-robot interaction, there are some studies to construct a bottom-up saliency map in consideration of voice signals (see, for example, Non-Patent Document 2).

CITATION LIST

Patent Document

[Non-Patent Document 1]
L. Itti, C. Koch, and E. Niebur, "A model of saliency-based visual attention for rapid scene analysis," in IEEE Transactions on Pattern Analysis and Machine Intelligence, vol. 20, no. 11, pp. 1254 to 1259, November 1998, doi: 10.1109/34.730558.
[Non-Patent Document 2]
Kae Nakajima, Tetsuto Minami, and Shigeki Nakauchi, "Interaction between facial expression and color," SCIENTIFIC REPORTS, 2017.

SUMMARY OF INVENTION

Technical Problem

However, the research that has previously been conducted has only considered visual clues without considering actual audio sources from a 3D environment. Also, the research that has previously been conducted has only considered simple visual saliency features (intensity, color, direction, and movement). Also, the research that has previously been conducted has only considered facial and hand features without considering auditory attention. The research that has previously been conducted has focused on top-down attention instead of bottom-up attention through stimuli. Thus, in the conventional technology, it has been difficult to calculate both visual attention and auditory attention.

An aspect according to the present invention has been made in view of the above-described problems, and an objective of the present invention is to provide a communication robot, a communication robot control method, and a program capable of controlling a robot by integrating both visual attention and auditory attention.

Solution to Problem

To achieve the above-described objective, the present invention adopts the following aspects.

(1) According to an aspect of the present invention, there is provided a communication robot including: an auditory information processing portion configured to recognize a volume of voice collected by a sound collection portion and generate an auditory attention map by projecting a sound position in a three-dimensional space onto a two-dimensional attention map in which the robot is located at a center; a visual information processing portion configured to generate a visual attention map using a face detection result obtained by detecting a face of a person from an image captured by an imaging portion and a motion detection result obtained by detecting a motion of the person; an attention map generation portion configured to generate an attention map by integrating the auditory attention map and the visual attention map; and a motion processing portion configured to control eyeball movements and motions of the communication robot using the attention map.

(2) In the above-described aspect (1), the visual information processing portion may generate the visual attention map by decomposing a saliency map created by detecting the face from the captured image and a motion thereof into the two of the visual attention map based on the detection of the face and the visual attention map based on the detection of the motion.

(3) In the above-described aspect (2), the visual attention map based on the detection of the face may be a face attention map, a detected face region may be highlighted with a value of a face size, the visual attention map based on the detection of the motion may be a motion attention map, and a detected moving object may be highlighted with a value of a movement speed.

(4) In any one of the above-described aspects (1) to (3), the auditory information processing portion may calibrate the projection of a sound source with a binary image based on a facing direction of a position, power, and duration and create each circle indicating the sound source, and center coordinates of each circle may be a position where a sound direction is three-dimensionally projected onto a two-dimensional image.

(5) In any one of the above-described aspects (1) to (4), the attention map generation portion may integrate the visual attention map and the auditory attention map from all normalized tension maps having a different value at each location in the same image size of frames.

(6) According to an aspect of the present invention, there is provided a communication robot control method including: recognizing, by an auditory information processing portion, a volume of voice collected by a sound collection portion and generating an auditory attention map by projecting a sound position in a three-dimensional space onto a two-dimensional attention map in which a robot is located at a center; generating, by a visual information processing portion, a visual attention map using a face detection result obtained by detecting a face of a person from an image captured by an imaging portion and a motion detection result obtained by detecting a motion of the person; generating, by an attention map generation portion, an attention map by integrating the auditory attention map and the visual attention map; and controlling, by a motion processing portion, eyeball movements and motions of a communication robot using the attention map.

(7) According to an aspect of the present invention, there is provided a program for causing a computer to: recognize a volume of voice collected by a sound collection portion and generate an auditory attention map by projecting a sound position in a three-dimensional space onto a two-dimensional attention map in which a robot is located at a center; generate a visual attention map using a face detection result obtained by detecting a face of a person from an image captured by an imaging portion and a motion detection result obtained by detecting a motion of the person; generate an attention map by integrating the auditory attention map and the visual attention map; and control eyeball movements and motions of a communication robot using the attention map.

Advantageous Effects of Invention

According to the above-described aspects (1) to (7), a robot can be controlled by integrating both visual attention and auditory attention.

BRIEF DESCRIPTION OF DRAWINGS

FIG. 9 is a diagram showing an example of data recognized by a cognition portion according to the embodiment.

DESCRIPTION OF EMBODIMENTS

Figure 1:
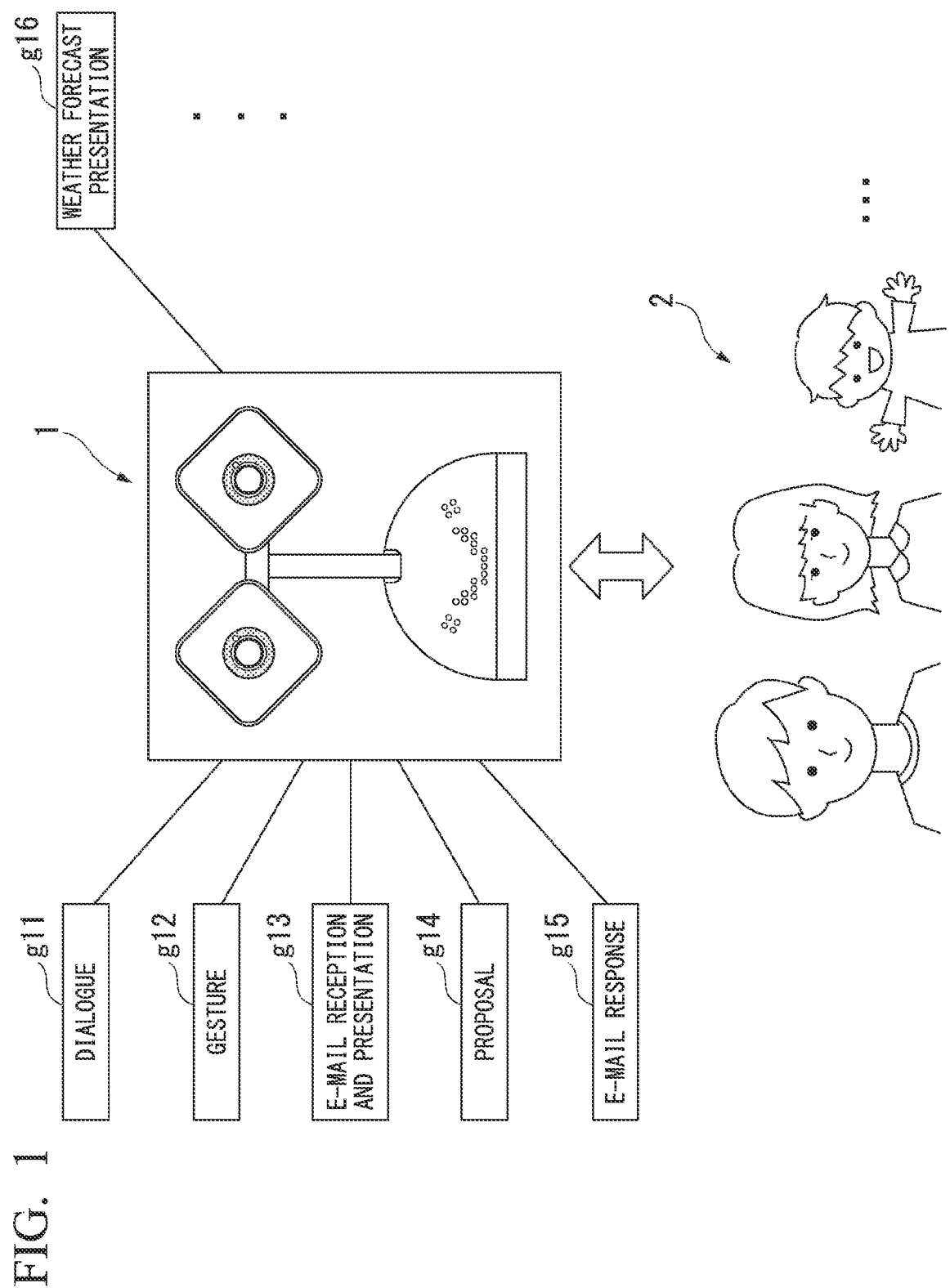
FIG. 1 is a diagram showing an example of communication of a communication robot according to an embodiment.

Hereinafter, embodiments of the present invention will be described with reference to the drawings. Also, in the drawings used for the following description, the scales of respective members may have been appropriately changed to make each member have a recognizable size.
<Overview>
FIG. 1 is a diagram showing an example of communication of a communication robot 1 according to an embodiment. As shown in FIG. 1, the communication robot 1 communicates with an individual or a plurality of people 2. Communication is mainly a dialogue g11 and a gesture g12 (motion). The motion is expressed by an image displayed on a display portion in addition to an actual motion. Also, when an e-mail is sent to a user via an Internet circuit or the like, the communication robot 1 receives the e-mail and notifies the user that the e-mail has been received and notifies the user of its content (g13). Also, when a response to the e-mail is required, for example, the communication robot 1 communicates with the user to ascertain whether advice is required and makes a proposal g14. The communication robot 1 sends the response (g15). Also, the communication robot 1 gives, for example, a presentation g16 of a weather forecast of a location corresponding to a scheduled date and time and location according to the user's schedule.

An aspect of the embodiment is an audio-visual bottom-up attention system for the communication robot 1. This system calculates both visual attention and auditory attention and can be used by the communication robot 1 to show subjectivity in reaching external stimuli like living organisms.
<Example of External Form of Communication Robot 1>
Next, an external example of the communication robot 1 will be described.

Figure 2:
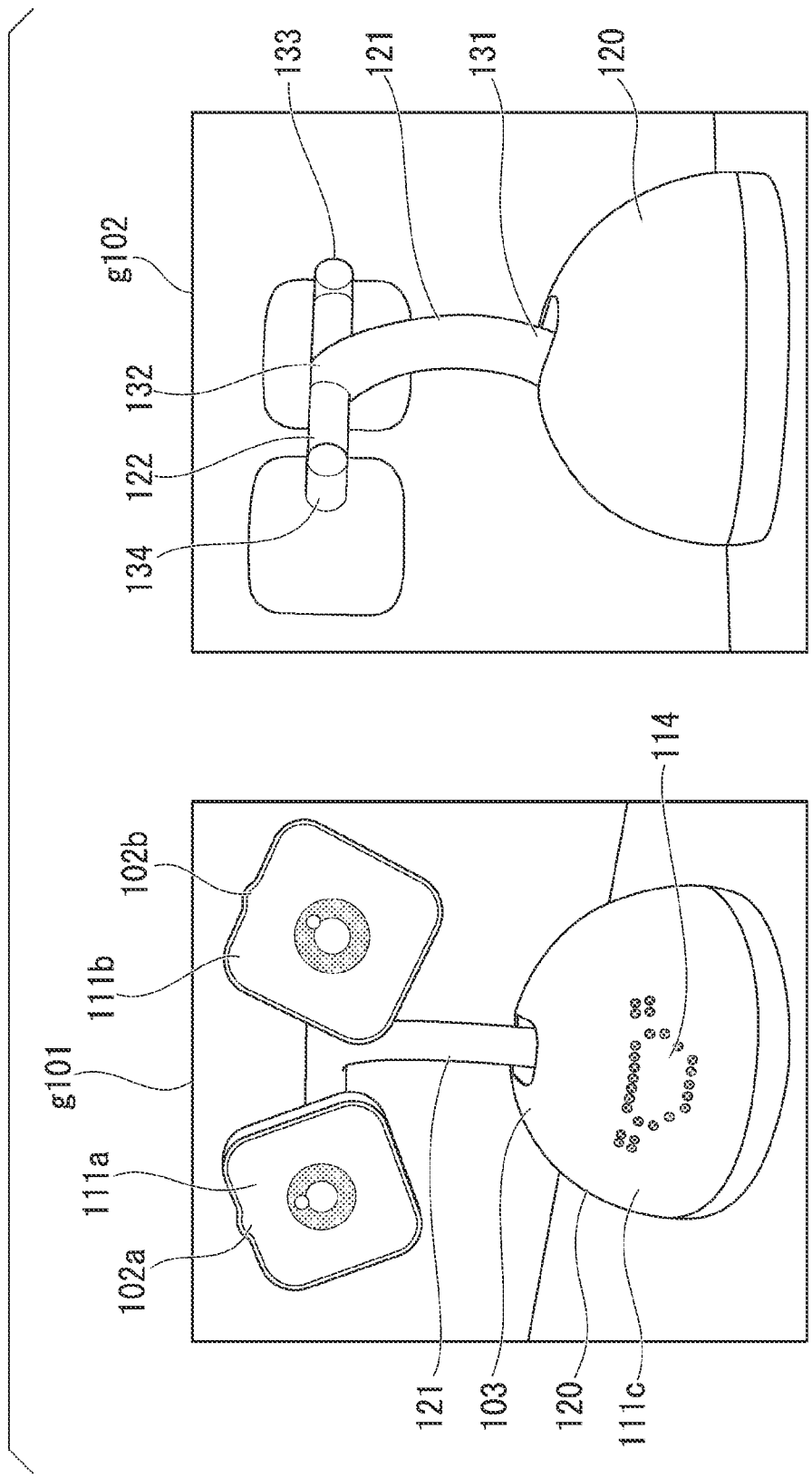
FIG. 2 is a diagram showing an example of an external form of a communication robot according to the embodiment.

FIG. 2 is a diagram showing an example of an external form of the communication robot 1 according to the embodiment. In the example of a front view g101 and a side view g102 of FIG. 2, the communication robot 1 includes three display portions 111 (an eye display portion 111a, an eye display portion 111b, and a mouth display portion 111c). Also, in the example of FIG. 3, an imaging portion 102a is attached to an upper part of the eye display portion 111a and an imaging portion 102b is attached to an upper part of the eye display portion 111b. The eye display portions 111a and 111b correspond to human eyes and present image information. A speaker 114 is mounted in a housing 120 in the vicinity of the mouth display portion 111c that displays an image corresponding to the human mouth. A sound collection portion 103 is attached to the housing 120.

Also, the communication robot 1 includes a boom 121. The boom 121 is movably attached to the housing 120 via a movable portion 131. The boom 121 has a horizontal bar 122 rotatably attached via a movable portion 132. Also, the eye display portion 111a is rotatably attached to the horizontal bar 122 via a movable portion 133, and the eye display portion 111b is rotatably attached via a movable portion 134.

In addition, the external form of the communication robot 1 shown in FIG. 2 is an example and is not limited thereto.

In the communication robot 1, images displayed on the eye display portions 111a and 111b correspond to images of human eyeballs and the boom 121 corresponds to a human neck. The communication robot 1 performs eyeball movements by moving positions of the eye images displayed on the eye display portions 111a and 111b. Also, when the boom 121 cannot deal with eyeball movement only with the eye images displayed on the eye display portions 111a and 111b configured to be tilted forward or tilted backward, the communication robot 1 controls the operation of the boom 121 to make a more natural motion.
<Bottom-Up Attention Map Including Visual Sense and Auditory Sense>
Next, bottom-up attention will be described.

The bottom-up attention is a sensory-driven selection mechanism that directs perception to a part of a stimulus. Neural processes of robots that control visual attention and auditory attention are the same as those of humans.

In the present embodiment, a function in which the robot automatically selects a position of attention including a visual sense and an auditory sense is added by the system.

Figure 3:
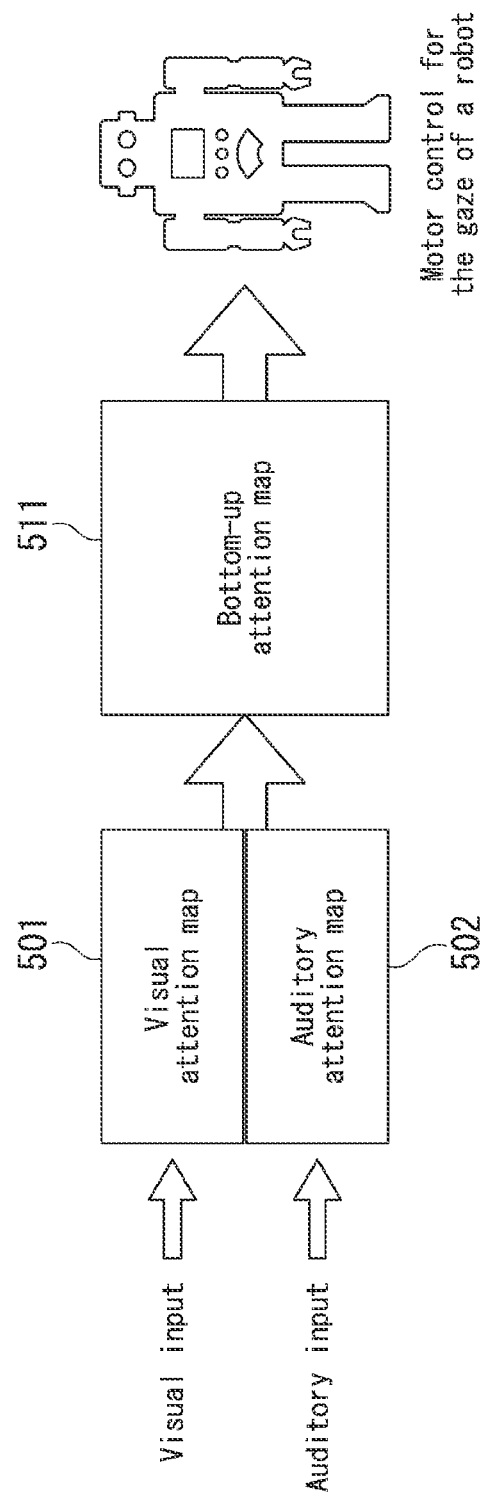
FIG. 3 is a diagram showing an overview of a process of generating a bottom-up attention map including a visual sense and an auditory sense according to the embodiment.

FIG. 3 is a diagram showing an overview of the generation of a bottom-up attention map including a visual sense and an auditory sense according to the embodiment. As shown in FIG. 3, visual information is input to a visual attention map 501 and auditory information is input to an auditory attention map 502. In an embodiment, the visual attention map 501 and the auditory attention map 502 are integrated to generate a bottom-up attention map 511. In the embodiment, the bottom-up attention map 511 is used to control a visual line of the communication robot 1 and, for example, the movement of the neck.

<Example of Configuration of Communication Robot 1>

Next, an example of a configuration of the communication robot 1 will be described.

Figure 4:
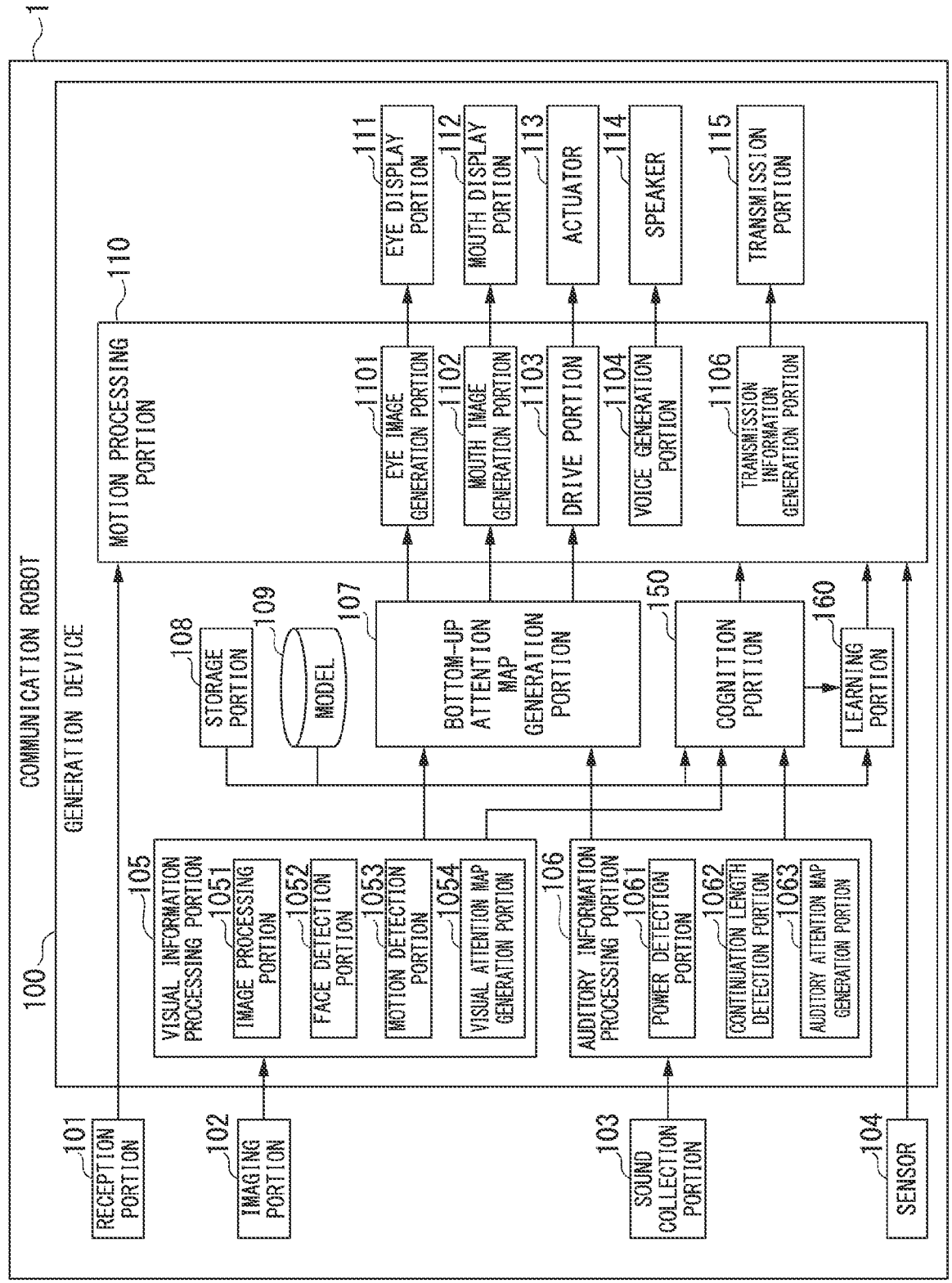
FIG. 4 is a block diagram showing an example of a configuration of the communication robot according to the embodiment.

FIG. 4 is a block diagram showing an example of a configuration of a communication robot according to the embodiment. As shown in FIG. 4, the communication robot 1 includes a reception portion 101, an imaging portion 102, a sound collection portion 103, a sensor 104, and a generation device 100. The generation device 100 includes, for example, a visual information processing portion 105, an auditory information processing portion 106, a bottom-up attention map generation portion 107, a storage portion 108, a model 109, a motion processing portion 110, an eye display portion 111 (a first display portion), a mouth display portion 112 (a second display portion), an actuator 113, a speaker 114, a transmission portion 115, a cognition portion 150, and a learning portion 160.

The visual information processing portion 105 includes an image processing portion 1051, a face detection portion 1052, a motion detection portion 1053, and a visual attention map generation portion 1054.

The auditory information processing portion 106 includes a power detection portion 1061, a continuation length detection portion 1062, and an auditory attention map generation portion 1063.

The motion processing portion 110 includes an eye image generation portion 1101, a mouth image generation portion 1102, a drive portion 1103, a voice generation portion 1104, and a transmission information generation portion 1105.

The reception portion 101 acquires information (for example, electronic information, blog information, news, weather forecasts, and the like) from, for example, the Internet, via a network and outputs the acquired information to the motion processing portion 110.

The imaging portion 102 is, for example, a complementary metal oxide semiconductor (CMOS) imaging element, a charge-coupled device (CCD) imaging element, or the like. The imaging portion 102 outputs a captured image to the visual information processing portion 105. In addition, the image is a moving image or a still image that is continuous in time. In addition, the communication robot 1 may include a plurality of imaging portions 102. In this case, the imaging portion 102, for example, may be attached to the front and rear of the housing of the communication robot 1.

The sound collection portion 103 is, for example, a microphone array composed of a plurality of microphones. The sound collection portion 103 outputs acoustic signals (human information) collected by the plurality of microphones to the auditory information processing portion 106. In addition, the sound collection portion 103 may sample each acoustic signal collected by the microphone with the same sampling signal, convert it from an analog signal into a digital signal, and then output the digital signal to the auditory information processing portion 106.

The sensor 104 is, for example, a temperature sensor that detects the temperature of an environment, an illuminance sensor that detects the illuminance of the environment, a gyro sensor that detects the inclination of the housing of the communication robot 1, an acceleration sensor that detects the movement of the housing of the communication robot 1, an air pressure sensor that detects air pressure, or the like. The sensor 104 outputs the detected detection value to the motion processing portion 110.

The visual information processing portion 105 generates a visual attention map using an image captured by the imaging portion 102.

The image processing portion 1051 performs well-known image processing on the captured image. The well-known image processing includes, for example, feature quantity detection, binarization, edge detection, contour detection, clustering processing, and the like.

The face detection portion 1052 two-dimensionally detects a human face, for example, using image-processed information.

The motion detection portion 1053 detects, for example, human eye movements, in a two-dimensional image.

The visual attention map generation portion 1054 generates a visual attention map using a detection result of the face detection portion 1052 and a detection result of the motion detection portion 1053.

The auditory information processing portion 106 generates an auditory attention map using an acoustic signal collected by the sound collection portion 103.

The power detection portion 1061 performs a fast Fourier transform on the collected acoustic signal and converts a transform result into a frequency domain signal, and then detects acoustic power in a well-known method.

The continuation length detection portion 1062 detects, for example, a continuation length of one phrase in a well-known method.

The auditory attention map generation portion 1063 generates an auditory attention map using a detection result of the power detection portion 1061 and a detection result of the continuation length detection portion 1062.

The bottom-up attention map generation portion 107 generates a bottom-up attention map by integrating a visual attention map and an auditory attention map.

The storage portion 108 stores programs, algorithms, predetermined values, threshold values, and the like necessary for various types of control and processing of the communication robot 1. The storage portion 108 stores a visual attention map, an auditory attention map, and a bottom-up attention map. Also, the storage portion 108 also stores a face attention map, a motion attention map, and a saliency map. The storage portion 108 stores, for example, a language model database, an acoustic model database, a dialogue corpus database, and an acoustic feature quantity used during voice recognition, a comparative image database and an image feature quantity used during image recognition, and the like. The storage portion 108 stores data related to an interpersonal relationship in relation to, for example, social components, social norms, social customs, psychology, humanities, and the like, used during learning. In addition, the storage portion 108 may be placed on the cloud or connected via a network.

The model 109 is a model for creating each attention map. In the model for creating a visual attention map, the input is visual information and the output is the visual attention map. In the model for creating an auditory attention map, the input is auditory information and the output is the auditory attention map. In the model for creating the bottom-up attention map, the input is the visual attention map and the auditory attention map and the output is the bottom-up attention map. The model for creating each attention map is created in learning using known information and training data.

The motion processing portion 110 generates an image displayed on the eye display portion 111 and the mouth display portion 112, generates a drive signal that drives the actuator 113, generates voice output from the speaker 114, and generates transmission information to be transmitted from the transmission portion 115.

The eye image generation portion 1101 generates an output image (a still image, a continuous still image, or a moving image) to be displayed on the eye display portion 111 using the bottom-up attention map, and causes the eye display portion 111 to display the generated output image. The displayed image is an image equivalent to human eye movements.

The mouth image generation portion 1102 generates an output image (a still image, a continuous still image, or a moving image) to be displayed on the mouth display portion 112 using the bottom-up attention map, and causes the mouth display portion 112 to display the generated output image. The displayed image is an image equivalent to human mouth movements.

The drive portion 1103 generates a drive signal for driving at least the neck actuator 113 using the bottom-up attention map and drives the actuator 113 with the generated drive signal.

The voice generation portion 1104 generates an output voice signal to be output to the speaker 114 on the basis of the information received by the reception portion and the like and causes the speaker 114 to output the generated output voice signal.

The transmission information generation portion 1106 generates transmission information to be transmitted on the basis of the received information, the captured image, and the collected voice signal, and causes the transmission portion 115 to transmit the generated transmission information.

The eye display portion 111 includes two parts on the left and right as shown in FIG. 2, and is, for example, a liquid crystal image display device, an organic electro luminescence (EL) image display device, or the like. The eye display portion 111 displays left and right eye images output by the eye image generation portion 1101. In addition, the eye display portion 111 can be moved, for example, upward/downward, left/right, in a rotation direction, and forward/backward.

The mouth display portion 112 is, for example, a light emitting diode (LED) or the like. The mouth display portion 112 displays a mouth image output by the mouth image generation portion 1102.

The actuator 113 drives at least a neck motion portion in response to a drive signal output by the drive portion 1103. The neck, for example, is configured to be able to tilt forward and backward.

The speaker 114 outputs an output voice signal output by the voice generation portion 1104.

The transmission portion 115 transmits transmission information output by the transmission information generation portion 1105 to a transmission destination via the network.

The cognition portion 150 cognizes an interaction occurring between the communication robot 1 and a human or an interaction occurring between two or more people. The cognition portion 150 acquires an image captured by the imaging portion 102, an acoustic signal collected by the sound collection portion 103, and a detection value detected by the sensor 104. In addition, the cognition portion 150 may acquire information received by the reception portion 101. The cognition portion 150 cognizes an interaction occurring between the communication robot 1 and the human or an interaction occurring between two or more people on the basis of the acquired information and the data stored in the storage portion 108. In addition, the cognition method will be described below. The cognition portion 150 outputs the cognized cognition results (a feature quantity related to voice and feature information related to human behavior) to the learning portion 160 and the motion processing portion 110.

The learning portion 160 learns a human emotional interaction using the cognition result output by the cognition portion 150 and the data stored in the storage portion 108. The learning portion 160 stores a model generated in learning. The learning method will be described below.

<Example of Process Performed by Visual Information Processing Portion, Auditory Information Processing Portion, and Bottom-Up Attention Map Generation Portion>

Next, a process performed by the visual information processing portion, the auditory information processing portion, and the bottom-up attention map generation portion will be described.

Figure 5:
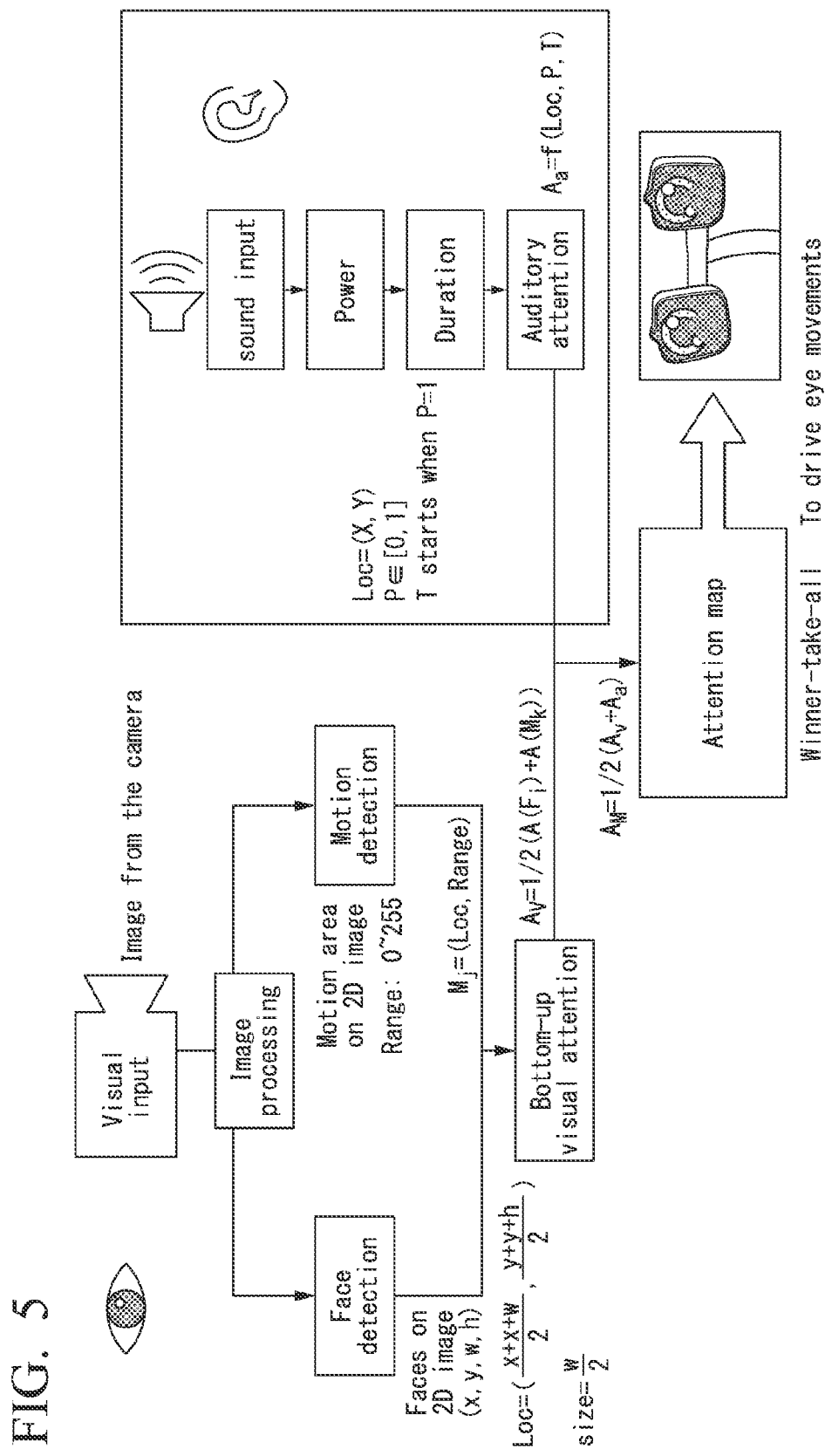
FIG. 5 is a diagram showing an example of a process performed by a visual information processing portion, an auditory information processing portion, and a bottom-up attention map generation portion according to the embodiment.

FIG. 5 is a diagram showing an example of a process performed by the visual information processing portion, the auditory information processing portion, and the bottom-up attention map generation portion according to the embodiment.

I. Visual Attention Map

First, the visual attention map will be described.

The visual information processing portion 105 uses a saliency map to decompose each capture frame from the image captured by the imaging portion 102 into two visual attention maps ($A(\cdot)$). In addition, the saliency map is created by detecting a face or detecting a motion from the captured image. Also, the visual information processing portion 105 decomposes the saliency map into two parts: a visual attention map obtained by detecting a face and a visual attention map obtained by detecting a motion.

The first visual attention map is a face attention map ($A(F_i)$) and highlights a detected face region i with a face size value.

The second visual attention map is a motion attention map ($A(M_k)$) and highlights a detected moving object (for example, eyes) k with a value of a movement speed.

The face detection portion 1052 uses, for example, a Viola-Jones Haar Cascade Classifier method (see Reference Document 1), to detect a face. When a face is detected in the input image, the face detection portion 1052 returns a position of each detected face Fi in rectangular coordinates and a size (x, y, w, h). x denotes a length in an x-axis direction, y denotes a length in a y-axis direction, w denotes a width of the face, and h denotes a height of the face.

One face region is a circle centered at coordinates (x+w/2, y+h/2) and having a diameter of w. A center position Loc of the face and a face size size are expressed as shown in the following Eqs. (1).

[Math. 1]

$$Loc = \left(\frac{x+x+w}{2}, \frac{y+y+h}{2}\right) \quad (1)$$

$$size = \frac{w}{2}$$

Loc denotes a coordinate position of the center of the detected face on each frame and size denotes a pixel size of each face on a frame screen. These two values indicate positions and sizes of all faces detected on the frame. Therefore, if the position and size of the face are known, a face attention map $A(F_i)$ with a pixel value of 1 in the face region and a pixel value of 0 in the other region can be created.

The motion detection portion 1053 generates a motion attention map $A(M_k)$ using, for example, a method based on a Gaussian mixture-based background/foreground segmentation algorithm (see Reference Document 2). In addition, for each moving object of the motion attention map, the value increases in accordance with a speed. Therefore, the motion detection portion 1053 sets a value from 0 to 1 for each pixel within a range of the moving object $M_k$. Also, the range of values of each pixel within the range of the moving object is a value with a predetermined range. This value increases in accordance with the position and speed of each moving object in the motion attention map. The motion detection portion 1053 detects a predetermined range, for example, human eyeball movements, in a two-dimensional image. The predetermined range is, for example, a range of 0 to 1. A motion detection value $M_j$ is expressed as shown in Eq. (2).

[Math. 2]

$$M_j = (Loc, Range) \quad (2)$$

Reference Document 1: Paul Viola and Michael J. Jones. "Robust real-time face detection," International Journal of Computer Vision, 57(2):137-154, 2004.

Reference Document 2: A. B. Godbehere, A. Matsukawa, and K. Goldberg, "Visual tracking of human visitors under variable-lighting conditions for a responsive audio art installation" 2012 American Control Conference (ACC), Montreal, Q C, 2012, pp. 4305 to 4312, doi:10.1109/ACC.2012.6315174.

The visual attention map generation portion 1054 integrates the face attention map and the motion attention map and creates one visual attention map $(A_v)$ shown in the following Eq. (3) that combines all of the two features of each frame t. In addition, the visual attention map is based on a two-dimensional binary image used in the embodiment, but is not limited thereto, and has, for example, three values or more in three dimensions.

[Math. 3]

$$A_v = \frac{1}{2}(A(F_i) + A(M_k)) \quad (3)$$

Thus, in the embodiment, a visual attention map focusing on the features of the face and movement is created. In each face region of each frame, different pixel weights are set in accordance with a speed of the facial movement. In addition, attention values of different faces can be calculated from magnitudes of pixels within the face region. A factor having an influence on the weight of an attention value is a size of the face region, in addition to the speed of movement. Here, when the face region is larger, the face is closer to the imaging portion 102 and the attention value is larger.

II. Auditory Attention Map

Next, the auditory attention map will be described.

In addition, in the auditory attention model, it is estimated to be a two-dimensional binary image having the same size as that in the visual attention map. Also, the auditory attention map is a projection surface for inputting acoustic information to a three-dimensional space.

The power detection portion 1061 performs a sound source localization process on a collected acoustic signal using, for example, multiple signal classification (MUSIC). The power detection portion 1061 evaluates a sound event candidate j in a specific direction as a valid location $\Phi_j$ on the basis of a power level (i.e., high power) and calculates power p in a framewise method.

The continuation length detection portion 1062 detects duration T, for example, by detecting a segment where the utterance of a sound event candidate j in a specific direction is greater than or equal to a predetermined threshold value.

The auditory attention map generation portion 1063 calibrates the projection of the sound source with a binary image based on a facing direction of position $\Phi_j$, power p, and duration T. The auditory attention map $A_a$ in which each circle indicates a sound source can be created. Also, the center coordinate (L) of each circle is a position where a sound direction is three-dimensionally projected onto a two-dimensional image.

The power p of the sound source is set to 0 or 1 in accordance with a threshold value for the power level. Also, when a sound volume exceeds a threshold value T'=T+1, the calculation of the duration T' is started. The value of the duration T is calculated as a diameter of a circle of the sound source using a function such as the following Eq. (4).

[Math. 4]

$$A_a = f(L, P, T), \quad (4)$$

where $$\begin{cases} L = \Phi_j(x, y) \\ P(t) \in [0, 1] \\ T' = T + 1 \end{cases}$$

The bottom-up attention map generation portion 107 integrates a visual attention map $A_v$ and an auditory attention map $A_a$. The bottom-up attention map generation portion 107 synthesizes a bottom-up attention map $(A_M)$ from all normalized attention maps having a different value at each location on the same image size of frames according to the following Eq. (5).

[Math. 5]

$$A_M = \frac{1}{2}(A_v + A_a) \quad (5)$$

Therefore, in the embodiment, the size of the face and the level of the sound source are changed to fuse visual and auditory information into one attention map.

In the embodiment, the purpose is to map the attention of the communication robot 1 to a location to which the user is paying most attention in an attention map in which a visual sense and an auditory sense are integrated. Therefore, a "Winner-take-all" (see Reference Document 3) mechanism, which is a neural network model of selective visual attention provided by Koch and Ullman, is used in the embodiment.

Reference Document 3: Koch, C., Ullman, S. (1985)., "Shifts in selective visual attention: Towards the underlying neural circuitry," Human Neurobiology, 4(4), 219-227.

In the model of Koch and Ullman et al., the feature map is integrated by a winner-round robin saliency map of bottom-up stimuli.

In contrast, in embodiments, after the integration of visual and auditory attention maps into one attention map, the "winner-take-all" competition between overlapping attention regions is activated and one region is ascertained as a "focus of attention," such that only the locations that attract the most attention remain and the other locations are suppressed.

When this attention model is used, close faces usually get more attention than distant faces and a moving face attracts more attention than a stationary face. Also, the face that is talking attracts more attention than the face that is silent. These examples suggest that this attention model is significantly similar to those of humans in everyday interactions.

<Example of Control of Communication Robot Using Bottom-Up Attention Map>

Next, an example of a control process of the communication robot 1 using a bottom-up attention map will be described. In the embodiment, the movement of the eyes and neck is controlled to move the visual line of the communication robot 1 in a direction that the person is paying the most attention to on the basis of the integrated bottom-up attention map.

First, eye movements will be described.

The eye image generation portion 1101 moves a center position of the eye to match a winning point on the bottom-up attention map. The eye image generation portion 1101 regards a screen on which the eye is displayed as a retina and cuts out an image obtained from the imaging portion 102 in the same magnitude (for example, 40°) as the amplitude of the peak-to-peak of the eye.

This eye image is seen by the user as an image on the retina of the communication robot 1. In addition, the eye is never stationary but has small eyeball movement that occurs constantly during fixation. For this reason, in the embodiment, the state in which the eyeball is located in the center of the screen with a microsaccade having an amplitude less than 0.5° (e.g., 9 pixels on the screen) is defined as an initial state of the eyeball.

In the above-described eye, a range in which eyeball movement is possible is, for example, predetermined. When a stimulus is projected within this range, the eye image generation portion 1101 moves the eyeball image to the projected position.

Next, the movement of the neck will be described.

When the projection is outside of the range, the eye image generation portion 1101 first moves the eye image to the projected position. Furthermore, the drive portion 1103 initiates head movement in the same direction to return the position of the eyes on the screen to the center range. Neck control is controlled in accordance with the rule of the following Eqs. (6) of eye-head coordination while the eyes move beyond the range of the eyes alone.

[Math. 6]

$$\vec{\alpha} = \mathit{diff}(\mathrm{Eye}_{x,y}, \mathrm{Center}_{x,y}) \quad (6)$$

$$\vec{\beta} = \vec{\alpha}(\alpha > \theta)$$

In Eqs. (6), $\alpha$ is an angular distance vector between the position of the eye and the center of the liquid crystal screen. The neck moves when $\alpha$ is less than a range $\theta$ of the eyeball only. An angle $\beta$ of neck movement has an angle of a magnitude and a direction identical to those of $\alpha$ so that the eyeball returns to the center position of the screen. $\theta$ is, for example, 10.

Assuming that there is a target object to which attention is paid around the communication robot 1, the eyes of the communication robot 1 first move to the target object and then the neck of the communication robot 1 begins to move in the same direction at the angle of the same magnitude. This is similar to the human vestibular ocular reflex (VOR), which is behavior that focuses the visual line on a target object of salivary glands.

Thus, in the present embodiment, the visual line is controlled to automatically guide to a location to which attention should be paid (the size and movement of the face are counted in the attention value). The bottom-up focus model is obtained by combining different sensory modalities (visual sense and auditory sense).

Figure 6:
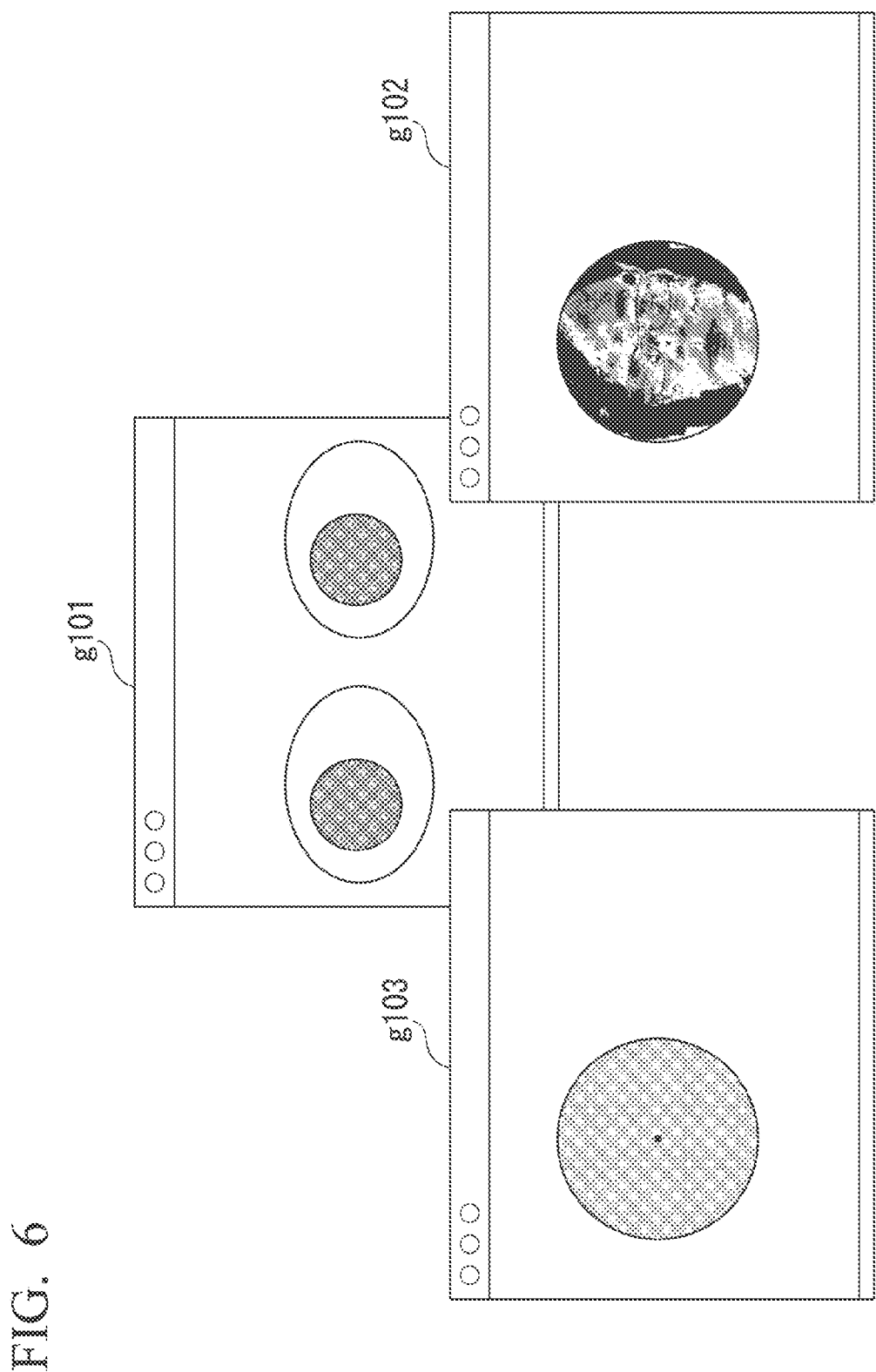
FIG. 6 is a diagram showing an example of processing results of parts according to the embodiment.
Figure 7:
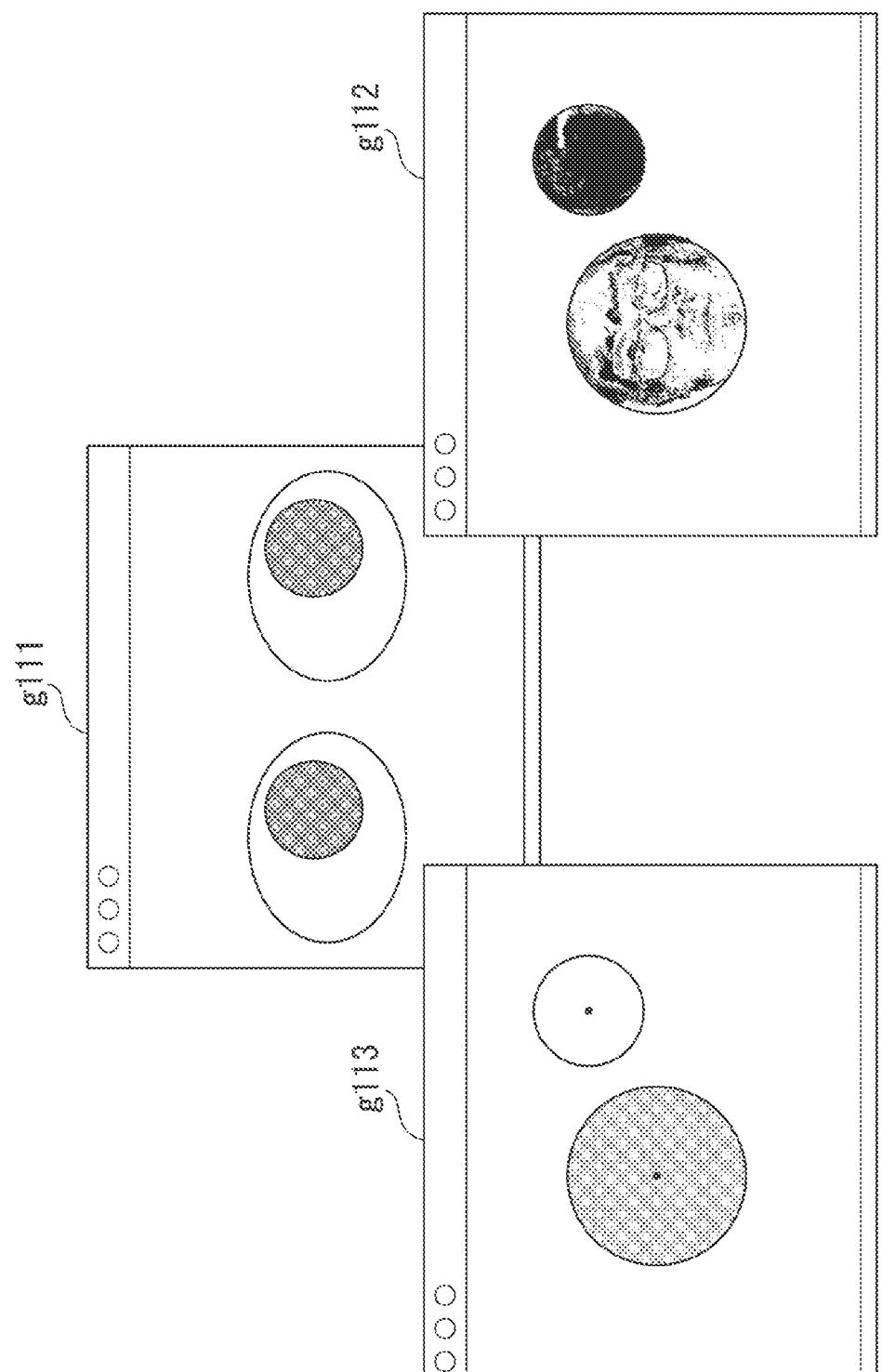
FIG. 7 is a diagram showing an example of processing results of parts according to the embodiment.

FIGS. 6 and 7 are diagrams showing examples of processing results of each part according to the present embodiment. The images g101 of FIG. 6 and the images g1 of FIG. 7 are images showing a state in which the visual line of the communication robot 1 automatically follows a location of attention. The images g102 of FIG. 6 and the images g112 of FIG. 7 indicate visual attention and are results of detecting a human face and its motion. The image g103 of FIG. 6 and the image g113 of FIG. 7 are bottom-up attention maps and are attention maps obtained by integrating visual information and auditory information.

For example, a visual attention map first detects a face and motion, the value of each face is calculated by size and motion features, and the eye follows a face with a maximum attention value. When there is a sound, all stimuli are finally compared with a bottom-up attention map and the eye automatically follows the location of the maximum value.

Audiovisual alert systems of the conventional technology have only considered simple visual features. On the other hand, an audiovisual attention system of the present embodiment is a bottom-up system that recognizes a face of a person, a moving object, and a sound in the environment. In the present embodiment, the magnitude of the sound is recognized and the sound position in the three-dimensional space is projected onto a two-dimensional attention map centered on the robot. Also, in the present embodiment, magnitudes of visual attention and auditory attention are automatically calculated and integrated into an attention map, and a maximum attention value is finally selected as the attention position of the robot.

(Flow of Cognition, Learning, and Social Competence)

In addition, the communication robot 1 may generate the social competence of the robot so that an emotional connection can be formed between the robot and the human, and communicates with the human, for example, in response to a human response or behavior.

Figure 8:
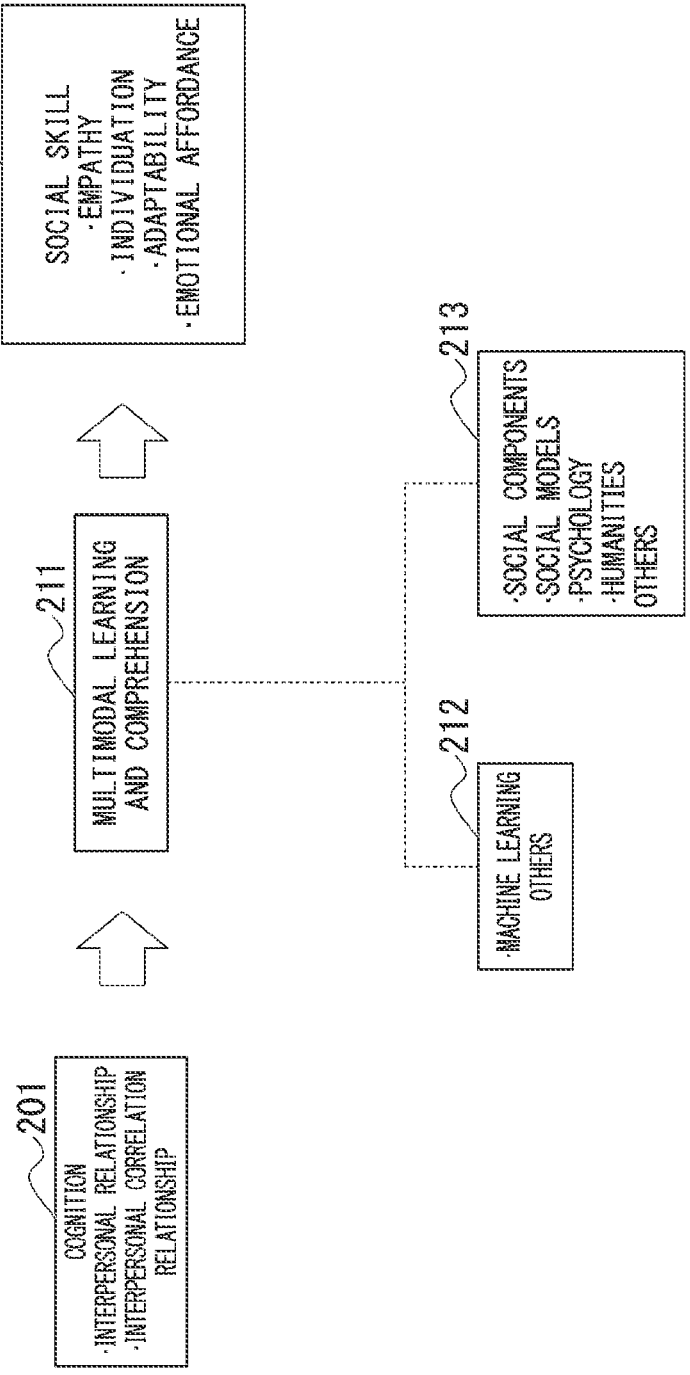
FIG. 8 is a diagram showing a flow of cognition, learning, and social competence performed by the communication robot of the embodiment.

Next, the flow of cognition and learning performed by the communication robot 1 will be described. FIG. 8 is a diagram showing a flow of cognition, learning, and social competence performed by the communication robot 1 of the present embodiment.

A recognition result 201 is an example of a recognition result of the cognition portion 150. The recognition result 201 is, for example, an interpersonal relationship, an interpersonal correlation relationship, or the like.

Multimodal learning and comprehension 211 are examples of learning content performed by the learning portion 160. The learning method 212 is machine learning or the like. Also, a learning target 213 is social components, social models, psychology, humanities, and the like.

Social competence 221 is a social skill, such as empathy, individuation, adaptability, emotional affordance, and the like.

(Data to be Recognized)

Next, an example of data recognized by the cognition portion 150 will be described.

FIG. 9 is a diagram showing an example of data recognized by the cognition portion 150 according to the present embodiment. In the embodiment, personal data 301 and interpersonal relationship data 351 are recognized as shown in FIG. 9.

Personal data is a motion that occurs within a human and is data acquired by the imaging portion 102 and the sound collection portion 103 and data obtained by performing a voice recognition process, an image recognition process, or the like on the acquired data. The personal data includes, for example, voice data, semantic data that is a voice processing result, a sound volume, a voice intonation, spoken words, facial expression data, gesture data, head posture data, face orientation data, visual line data, co-occurrence expression data, physiological information (a body temperature, a heart rate, a pulse rate, and the like), and the like. Also, a type of data to use may be selected, for example, by a designer of the communication robot 1. In this case, for example, for actual communication or demonstration of two people, the designer of the communication robot 1 may set important features among the personal data in communication. Also, the cognition portion 150 cognizes the user's emotions as personal data on the basis of the information extracted from the acquired utterances and images. In this case, the cognition portion 150 performs cognition on the basis of, for example, the sound volume or intonation, the utterance duration, the facial expressions, and the like. Also, the communication robot 1 of the embodiment performs a control process so that interaction for maintaining good emotions of the user and maintaining a good relationship with the user is performed.

Here, an example of a method of recognizing the user's social background (background) will be described.

The cognition portion 150 estimates the nationality, hometown, and the like of the user on the basis of the acquired utterance and image, and the data stored in the storage portion 108. The cognition portion 150 extracts the user's life schedule such as wake-up time, outing time, return time, and bedtime on the basis of the acquired utterance and image and the data stored in the storage portion 108. The cognition portion 150 estimates the user's gender, age, occupation, hobby, career, preference, family structure, religion to which the user belongs, degree of affinity to the communication robot 1, and the like on the basis of the acquired utterances, images, life schedules, and data stored in the storage portion 108. In addition, because the social background may change, the communication robot 1 updates information about the social background of the user on the basis of the conversation, the image, and the data stored in the storage portion 108. In addition, in order to enable emotional sharing, the social background and the degree of affinity to the communication robot 1 are not limited to possible input levels of age, gender, career, and the like, but, for example, cognition is performed on the basis of emotional ups and downs depending on a time period, a sound volume and intonation regarding a topic, and the like. Thus, the cognition portion 150 learns what the user is not aware of with confidence on the basis of daily conversations, facial expressions at the time of conversation, and the like.

Interpersonal relationship data is data about a relationship between the user and others. By using the interpersonal relationship data in this way, social data can be used. The interpersonal relationship data includes, for example, a distance between people, whether or not visual lines of people interacting with each other are intersecting, the voice intonation, the sound volume, and the like. The distance between people varies with the interpersonal relationship, as will be described below. For example, in the case of a couple or friends, an interpersonal relationship is L1 and an interpersonal relationship between businessmen is L2, which is larger than L1.

In addition, for example, for the actual communication or demonstration of two people, the designer of the communication robot 1 may set an important feature in interpersonal data in communication. In addition, such personal data, interpersonal relationship data, and information about the social background of the user are stored in the storage portion 108.

Also, when there are multiple users, the cognition portion 150, for example, collects and learns personal data for each user in the case of a user and his or her family and estimates the social background of each person. Such a social background may be acquired, for example, via a network and a reception portion 101. In this case, the user, for example, may input or select an item of his or her social background with a smartphone or the like.

Here, an example of a method of recognizing interpersonal relationship data will be described.

The cognition portion 150 estimates an interpersonal distance (interval) at which communication is performed on the basis of the acquired utterance and image and the data stored in the storage portion 108. The cognition portion 150 detects whether or not the visual lines of persons between which communication is performed are intersecting on the basis of the acquired utterance and image and the data stored in the storage portion 108. On the basis of the acquired utterance and the data stored in the storage portion 108, the cognition portion 150 estimates friendships, work colleagues, and relatives/parent-child relationships on the basis of utterance content, a sound volume, a voice intonation, a received e-mail, a transmitted e-mail, and a communication partner of a transmission/reception destination of the transmitted/received e-mail.

In addition, in the initial state to be used, the cognition portion 150 may be configured to randomly select, for example, one from combinations of several social backgrounds and initial values of personal data stored in the storage portion 108, and start communication. Also, the cognition portion 150 may be configured to reselect another combination when it is difficult to continue communication with the user due to the motion generated according to the randomly selected combination.

(Learning Procedure)

In the embodiment, the learning portion 160 performs a learning process using the personal data 301 and the interpersonal relationship data 351 recognized by the cognition portion 150 and the data stored in the storage portion 108.

Here, social composition and social norms will be described. In spaces where people participate in social interactions, for example, an interpersonal relationship differs according to a distance between people. For example, a relationship with a distance of 0 to 50 cm from a person is an intimate relationship and a relationship with a distance of 50 to 1 m from a person is a personal relationship. A relationship with a distance of 1 to 4 m from a person is a social relationship and a relationship with a distance of 4 m or more from a person is a public relationship. Such a social norm is used as a reward (implicit reward) to determine whether or not a gesture and utterance match a social norm during learning.

Also, the interpersonal relationship may be set according to an environment to be used and the user by setting a reward feature quantity at the time of learning. Specifically, settings of a plurality of intimacy degrees such as setting a rule that does not talk much to people who don't like robots, and setting a rule to actively talk to people who like robots may be provided. Also, in an actual environment, the cognition portion 150 may cognize a type of user on the basis of a result of processing the user's utterance and image and the learning portion 160 may select a rule.

Also, a human trainer may evaluate the behavior of the communication robot 1 and provide a reward (implicit reward) according to the social composition and norms that he or she knows.

Figure 10:
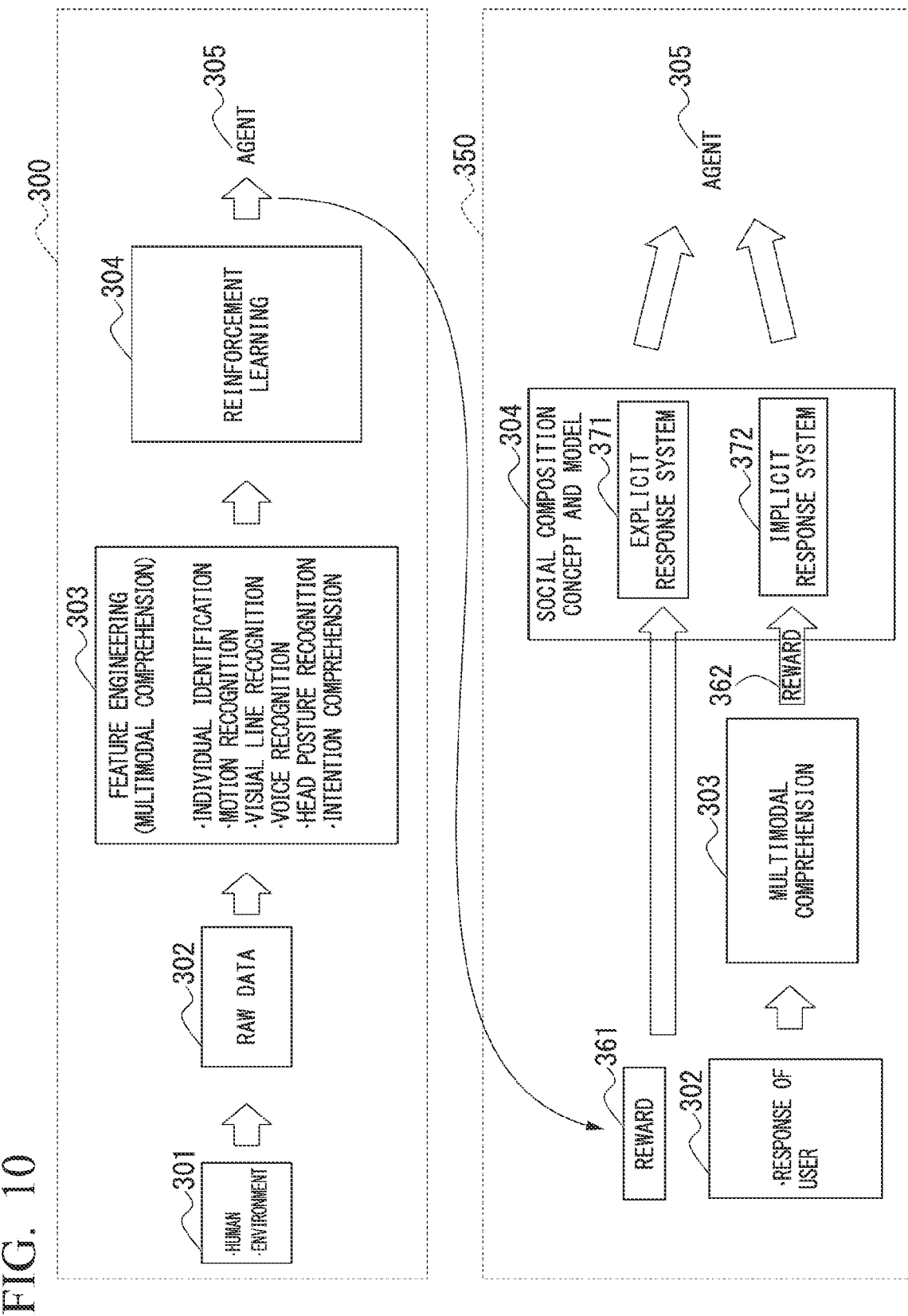
FIG. 10 is a diagram showing an example of an agent creation method used by a motion processing portion according to the embodiment.

FIG. 10 is a diagram showing an example of an agent creation method used by the motion processing portion 110 according to the present embodiment.

A region denoted by reference sign 300 is a diagram showing a flow until an agent is created from an input and an output (an agent) is provided.

The image captured by the imaging portion 102 and information 310 of a sound collected by the sound collection portion 103 are information about a person (a user, a related person of the user, or another person) and environmental information around the person. Raw data 302 acquired by the imaging portion 102 and the sound collection portion 103 is input to the cognition portion 150.

The cognition portion 150 extracts and recognizes a plurality of information items (a sound volume, a voice intonation, utterance content, spoken words, the user's visual line, the user's head posture, the user's face orientation, the user's ecological information, a distance between people, whether or not the visual lines of people are intersecting, and the like) from the input raw data 302. The cognition portion 150 performs multimodal comprehension using, for example, a neural network using a plurality of extracted and recognized information items.

The cognition portion 150 identifies an individual on the basis of, for example, at least one of a voice signal and an image, and assigns identification information (ID) to the identified individual. The cognition portion 150 cognizes a motion of each identified person on the basis of at least one of the voice signal and the image. The cognition portion 150 performs well-known image processing and tracking processing on the image, for example, to recognize the visual line of the identified person. For example, the cognition portion 150 recognizes voice by performing voice recognition processing (sound source identification, sound source localization, sound source separation, utterance segment detection, noise suppression, and the like) on the voice signal. The cognition portion 150, for example, performs well-known image processing on the image to recognize the head posture of the identified person. For example, when two people are imaged in the captured image, the cognition portion 150 recognizes an interpersonal relationship on the basis of utterance content, a distance between the two people in the captured image, and the like. The cognition portion 150 cognizes (estimates) a social distance between the communication robot 1 and the user according to, for example, a result of processing the captured image and the collected voice signal.

The learning portion 160 performs reinforcement learning 304 instead of deep learning. In reinforcement learning, learning is performed to select the most relevant feature (including social composition and social norms). In this case, a plurality of information items used in multimodal comprehension are used as a feature for an input. The input of the learning portion 160 is, for example, raw data itself, a name ID (identification information), a facial influence, a recognized gesture, a keyword from voice, and the like. The output of the learning portion 160 is a motion of the communication robot 1. It is only necessary for the output motion to be defined according to a purpose and the output motion is related to, for example, a voice response, a robot routine, an orientation angle for robot rotation, and the like. In addition, in the multimodal comprehension, a neural network or the like may be used for detection. In this case, different modalities of the body may be used to detect human activity. Also, features to use may be selected in advance, for example, by the designer of the communication robot 1. Furthermore, in the present embodiment, social models and social composition can be incorporated using implicit rewards and explicit rewards during learning. A reinforcement learning result is an output and is an agent 305. Thus, in the present embodiment, an agent used by the motion processing portion 110 is created.

A region indicated by reference sign 350 is a diagram showing how the reward is used.

An implicit reward 362 is used to learn the implicit response. In this case, the raw data 302 includes the user's response, and the raw data 302 is about the above-described multimodal comprehension 303. The learning portion 160 generates an implicit response system 372 using the implicit reward 362, the social model stored in the storage portion 108, and the like. The implicit reward may be obtained by reinforcement learning or may be given by humans. Also, the implicit response system may be a model acquired in learning.

For the learning of an explicit response, for example, a human trainer evaluates the behavior of the communication robot 1 and gives a reward 361 according to the social composition and social norms that the human trainer knows. In addition, the agent adopts the behavior that maximizes the reward for the input. Thereby, the agent adopts behaviors (utterances and gestures) that maximize positive emotions towards the user.

The learning portion 160 uses this explicit reward 361 to generate an explicit response system 371. In addition, the explicit response system may be a model acquired in learning. In addition, the explicit reward may be given by the user evaluating the behavior of the communication robot 1, and the communication robot 1 may estimate the reward on the basis of the user's utterance and behavior (a gesture, a facial expression, or the like), for example, on the basis of whether or not the user has been able to perform the desired behavior and the like.

The learning portion 160 outputs the agent 305 using these learning models during operation.

In addition, in the embodiment, for example, an explicit reward that is a user's response takes precedence over an implicit reward. The reason for this is that the user's response is more reliable in communication.

As described above, in the present embodiment, the destination of attention is determined from a sound and a video.

Thereby, according to the present embodiment, it is possible to provide an efficient control strategy for the development of attention based on a bottom-up clue including visual and auditory inputs in a centralized two-dimensional attention map.

Also, all or some processes to be performed by the communication robot 1 may be performed by recording a program for implementing all or some functions of the communication robot 1 according to the present invention on a computer-readable recording medium and causing a computer system to read and execute the program recorded on the recording medium. Also, it is assumed that the "computer system" used here includes an operating system (OS) or hardware such as peripheral devices. Also, the "computer system" is assumed to include a WWW system including a homepage provision environment (or a display environment). Also, the "computer-readable recording medium" refers to a flexible disk, a magneto-optical disc, a read-only memory (ROM), a portable medium such as a compact disc-ROM (CD-ROM), or a storage device such as a hard disk embedded in the computer system. Further, the "computer-readable recording medium" is assumed to include a computer-readable recording medium for holding the program for a given period of time as in a volatile memory (for example, a random-access memory (RAM)) inside the computer system including a server and a client when the program is transmitted via a network such as the Internet or a communication circuit such as a telephone circuit.

Also, the above-described program may be transmitted from a computer system storing the program in a storage device or the like via a transmission medium or transmitted to another computer system through transmission waves in a transmission medium. Here, the "transmission medium" for transmitting the program refers to a medium having a function of transmitting information as in a network (a communication network) such as the Internet or a communication circuit (a communication line) such as a telephone circuit. Also, the above-described program may be a program for implementing some of the above-described functions. Further, the above-described program may be a program capable of implementing the above-described function in combination with a program already recorded on the computer system, i.e., a so-called differential file (differential program).

Although embodiments for carrying out the present invention have been described above using embodiments, the present invention is not limited to the embodiments and various modifications and substitutions can be made without departing from the scope and spirit of the present invention.

REFERENCE SIGNS LIST

1 Communication robot
101 Reception portion
102 Imaging portion
103 Sound collection portion
104 Sensor
105 Visual information processing portion
106 Auditory information processing portion
107 Bottom-up attention map generation portion
108 Storage portion
109 Model
110 Motion processing portion
111 Eye display portion
112 Mouth display portion
113 Actuator
114 Speaker
115 Transmission portion
150 Cognition portion
160 Learning portion
1051 Image processing portion
1052 Face detection portion
1053 Motion detection portion
1054 Visual attention map generation portion
1061 Power detection portion
1062 Continuation length detection portion
1063 Auditory attention map generation portion
1101 Eye image generation portion
1102 Mouth image generation portion
1103 Drive portion
1104 Voice generation portion
1105 Transmission information generation portion

What is claim is:

1. A communication robot comprising:
an auditory information processing portion configured to recognize a volume of voice collected by a sound collection portion and generate an auditory attention map by projecting a sound position in a three-dimensional space onto a two-dimensional attention map in which the robot is located at a center;
a visual information processing portion configured to generate a visual attention map using a face detection result obtained by detecting a face of a person from an image captured by an imaging portion and a motion detection result obtained by detecting a motion of the person;
an attention map generation portion configured to generate an attention map by integrating the auditory attention map and the visual attention map; and
a motion processing portion configured to control eyeball movements and motions of the communication robot using the attention map.

2. The communication robot according to claim 1, wherein the visual information processing portion generates the visual attention map by decomposing a saliency map created by detecting the face from the captured image and a motion thereof into the two of the visual attention map based on the detection of the face and the visual attention map based on the detection of the motion.

3. The communication robot according to claim 2,
wherein the visual attention map based on the detection of the face is a face attention map, and a detected face region is highlighted with a value of a face size, and
wherein the visual attention map based on the detection of the motion is a motion attention map, and a detected moving object is highlighted with a value of a movement speed.

4. The communication robot according to claim 1,
wherein the auditory information processing portion calibrates the projection of a sound source with a binary image based on a facing direction of a position, power, and duration and creates each circle indicating the sound source, and
wherein center coordinates of each circle are a position where a sound direction is three-dimensionally projected onto a two-dimensional image.

5. The communication robot according to claim 1, wherein the attention map generation portion integrates the visual attention map and the auditory attention map from all normalized tension maps having a different value at each location in the same image size of frames.

6. A communication robot control method comprising:
recognizing, by an auditory information processing portion, a volume of voice collected by a sound collection portion and generating an auditory attention map by projecting a sound position in a three-dimensional space onto a two-dimensional attention map in which a robot is located at a center;
generating, by a visual information processing portion, a visual attention map using a face detection result obtained by detecting a face of a person from an image captured by an imaging portion and a motion detection result obtained by detecting a motion of the person;
generating, by an attention map generation portion, an attention map by integrating the auditory attention map and the visual attention map; and
controlling, by a motion processing portion, eyeball movements and motions of a communication robot using the attention map.

7. A non-transitory computer-readable storage medium storing a program for causing a computer to:
recognize a volume of voice collected by a sound collection portion and generate an auditory attention map by projecting a sound position in a three-dimensional space onto a two-dimensional attention map in which a robot is located at a center;
generate a visual attention map using a face detection result obtained by detecting a face of a person from an image captured by an imaging portion and a motion detection result obtained by detecting a motion of the person;
generate an attention map by integrating the auditory attention map and the visual attention map; and
control eyeball movements and motions of a communication robot using the attention map.

* * * * *